United States Patent [19]

Horan et al.

[11] Patent Number: 4,941,765
[45] Date of Patent: Jul. 17, 1990

[54] ADJUSTABLE HEIGHT CLAMPING STAND

[75] Inventors: Gerald P. Horan, Markham; John T. Wickmann, Omemee; Richard C. Olak, Peterborough, Canada

[73] Assignee: Chart Industries, Ltd., Ontario, Canada

[21] Appl. No.: 183,595

[22] Filed: Apr. 19, 1988

[30] Foreign Application Priority Data

Dec. 17, 1987 [CA] Canada ............................ 554660

[51] Int. Cl.$^5$ .................... F16B 7/10; B21D 1/12
[52] U.S. Cl. .................... 403/107; 403/109; 403/362; 403/377; 248/352; 72/705
[58] Field of Search ............ 248/352, 354.4, 354.5, 248/188.5; 72/422, 705; 403/107, 108, 109, 104, 362, 106, 377, 378, 380

[56] References Cited

U.S. PATENT DOCUMENTS

| | | | |
|---|---|---|---|
| 906,693 | 12/1908 | Cook | 403/107 |
| 2,477,477 | 7/1949 | Cook | 403/107 X |
| 2,693,255 | 11/1954 | Dicke et al. | 403/362 X |
| 3,802,658 | 4/1974 | Binding | 248/352 |
| 4,344,314 | 8/1982 | Aldrich et al. | 72/705 X |
| 4,516,423 | 5/1985 | Reich | 72/422 |
| 4,520,649 | 6/1985 | Barton, Sr. | 248/352 X |
| 4,585,198 | 4/1986 | Chartier et al. | 248/352 |

FOREIGN PATENT DOCUMENTS 8002184 10/1980 World Int. Prop. O. .......... 403/107

Primary Examiner—Peter M. Cuomo
Attorney, Agent, or Firm—Weingarten, Schurgin, Gagnebin & Hayes

[57] ABSTRACT

A clamping system for use in supporting automotive vehicles in secured relation above a floor surface includes an adjustable height pedestal having a base member with a ram member entered in sliding relation therein. Laterally inclined convergent internal side walls serve as guides to keep in mutually centered relation a pair of vertically extending mating faces of the base member and the ram member. These mating faces have laterally extending tooth members standing proud of their surfaces in mutually interengageable relation to lock the members together against vertical displacement. Clearance within the base member sufficient for the lateral disengagement of the respective tooth members permits vertical adjustment of the ram member relative to the base. Jacking screws extending laterally within the base serve to hold the ram member in tooth engaged relation with the mating face of the base, in a locked, pre-set position of a predetermined height. One or more clamps of the scott clamp type are used for securing the vehicle by its underside. In the case of a single clamp it is secured directly to the ram. Alternatively, a pair of scott clamps can be mounted in offset mutual force-balancing relation on a balance beam. The balance beam in one embodiment is pivotally attached at its center, to the ram. The pivotal attachment connection can be locked by way of a tapered joint. In a further embodiment the beam is rigidly secured to the ram.

18 Claims, 4 Drawing Sheets

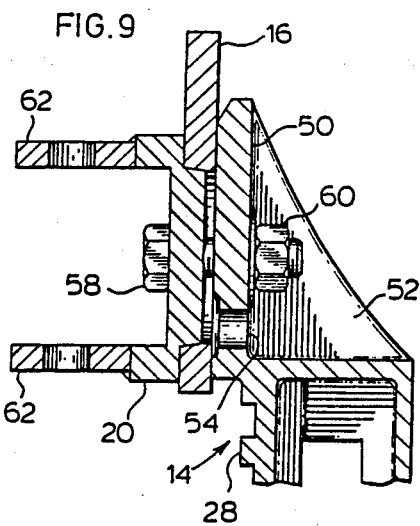
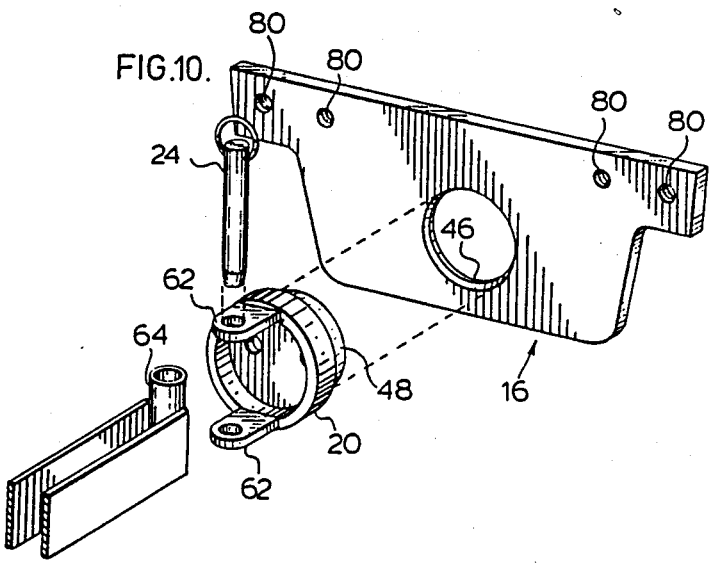

ADJUSTABLE HEIGHT CLAMPING STAND

FIELD OF THE INVENTION

This invention is directed to a clamping system for supporting vehicles, and in particular to a modular, adjustable height vehicle clamping system.

BACKGROUND OF THE INVENTION

Vehicle clamping systems for use in carrying out repair work on damaged vehicles are well known.

In carrying out repairs on damaged bodies of automotive vehicles it is necessary to secure the vehicle body in tightly held, strongly secured immovable relation to the floor, or to a base plate supported by the floor in order to permit the application of damage rectification forces to the vehicle body, in corrective straightening relation therewith.

The closest prior art subject matter is probably a fixed pedestal clamping arrangement manufactured by the assignee of the present invention, and incorporating a single scott type clamp, in co-operation with a unitary pedestal portion of fixed height. The prior art fixed pedestal arrangement suffered from the disadvantage of being a compromise in regards to its height setting, in an attempt to provide strong, stable clamping capability suitable for use with a wide range of vehicles and a wide range of operational height requirements.

SUMMARY OF THE INVENTION

The present invention provides a robust, adjustable height clamping pedestal arrangement, suitable for supporting automotive vehicles so as to withstand the application of large, body rectifying forces.

The present invention further provides a clamping system having robust tooth portions of the respective ram and base portions in selectable, positively engaging relation, to provide a range of height adjustment thereto, and positive locking means to preclude the undesired disengagement of the ram tooth means from the base tooth means.

The subject system is further characterized by wide teeth flanked by inclined centering surfaces in mating relation between the ram and base portions, to centre the respective tooth portions in mutually centered relation, and to preclude relative lateral canting motion of the ram portion in pivotal relation about a supporting tooth member of the base portion of the device.

The subject locking means comprises at least one jacking screw, extending between the base of the device and the ram portion in adjustable inward jamming relation against the ram portion, to maintain the ram teeth and a tooth of the base portion in locked engaging relation, and to secure the ram against relative displacement under load.

The subject system further provides a clamping arrangement wherein a single clamp means can be secured in upward extending relation from the ram, or a pair of scott or like clamp means can be secured to a balance beam, and the balance beam pivotally secured to an upper portion of the ram. This permits a certain degree of freedom to the system in setting up a vehicle. The subject scott clamps, or their equivalent, are generally clamped to the vehicle downwardly projecting rib portions, extending longitudinally adjacent the rocker panels, beneath many automotive vehicles. In the case of the double clamp embodiment, the clamp securing means includes a pivotal mount bolted to the ram, to permit rotational articulation of the clamp means thereabout in adjustable load transfer relations therewith.

The preferred pivotal mount incorporates a tapered annular seat of generally conical form, so that the rotational action of the pivotal mount can be immobilized.

A second embodiment of the subject clamping system incorporates a "balance beam" mounted in non-pivotal relation to the pedestal.

In the preferred embodiment, the scott clamps are generally in conformity with previously used clamps of this type. However, the bottom located pintle pin is of extended length to convey greater clearance between the opposed jaw portions of the clamp. This space provision has been utilized to introduce a clamp securing nut for attaching the clamp support bar in rigidly bolted relation with the back jaw. The extended pintle pin thus permits location of the line of action of the jaws of the clamp in substantial co-planar relation with the plane of the clamp support bar.

In the preferred embodiments the ram means has a plurality of teeth arranged in spaced relation one above the other and having the horizontal surfaces thereof extending substantially at right angles to and extending proud of the surface of the ram means.

In the preferred embodiments the ram means is hollow, having an external rearward face on which the tooth members are located and a frontal face against which locking means bear. The locking means is in the form of a pair of cap screws extending across an internal clearance space, to bear in thrusting relation against the frontal face of the ram. An interior vertical rib within the ram means interconnects the front and back walls of the ram means in load transfer relation therebetween, against the thrust of the cap screws.

In addition to the adjustable height ram means that is supported by the system base portion, the base portion also includes vertically spaced apart lugs projecting rearwardly of the base portion, having a pivot pin removably inserted therein, and a second, ancilliary support means carried thereby, comprising an arm pivotally mounted on the pivot pin, and having an adjustable steady means extending upwardly therefrom. The steady means includes a pivotal bearing pad, for making contact with a load spreader such as a timber four by four (4"×4" section) set against an under surface portion of a vehicle floor. Thus, in addition to supporting a vehicle in clamped relation the subject system further provides ancilliary bracing to resist downward buckling of the floor of the vehicle in the vicinity of the clamp means. Use of the second support means can extend through a range of angular position, in view of the pivot pin mounting. The pivotal arm of the ancilliary support means comprises a pair of parallel members between which the adjustable steady means is mounted, whereby the radial location of the steady can be adjusted, to position the ancilliary support means closer to or further from the base portion.

BRIEF DESCRIPTION OF THE DRAWINGS

Certain embodiments of the invention are described, reference being made to the accompanying drawings, wherein:

FIG. 9 is an end section, taken at 9—9 of FIG. 6; and

FIG. 10 is a general view of the clamp balance beam and its pivoted mount, in exploded relation.

DETAIL DESCRIPTION OF ILLUSTRATED EMBODIMENTS

Figure 1:
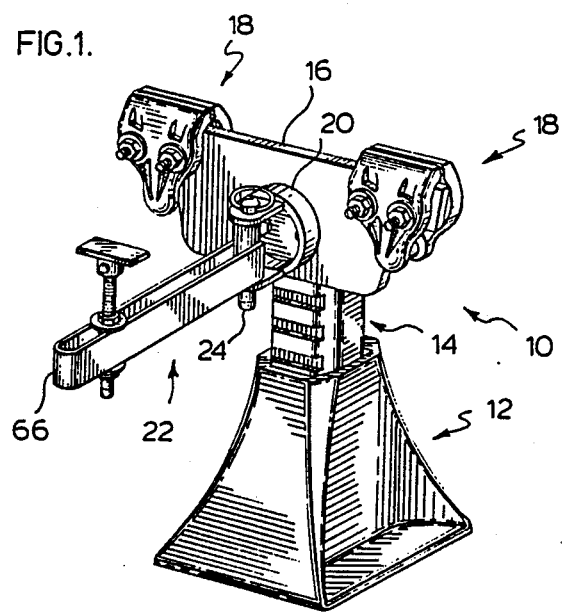
FIG. 1 is a general view of the subject clamping system, in inward facing relation as seen from beneath a supported vehicle.
Figure 2:
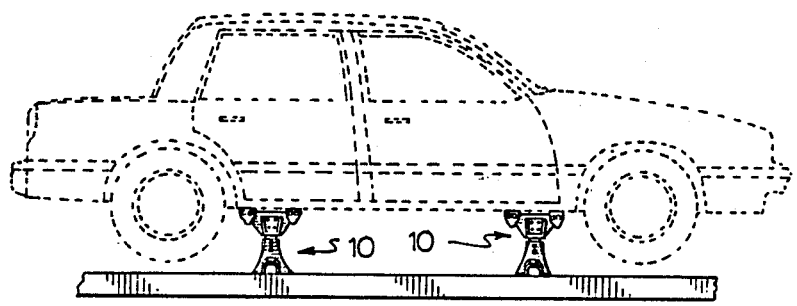
FIG. 2 is a side view showing a pair of the subject clamps supporting a vehicle, in phantom, thereon.
Figure 3:
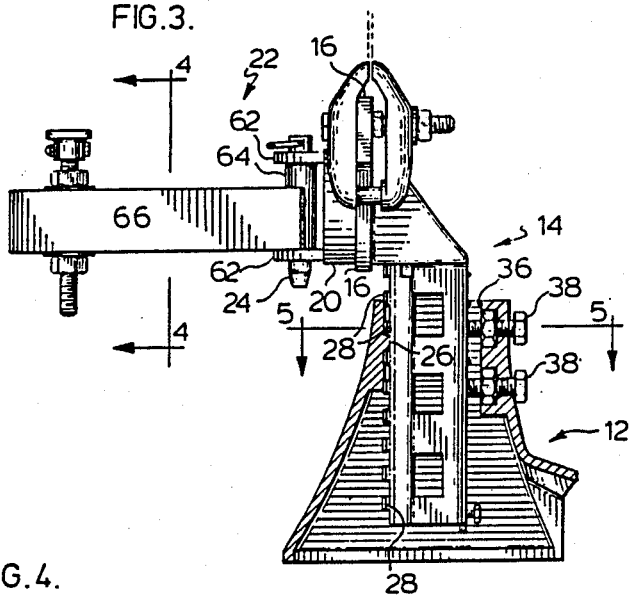
FIG. 3 is a side elevation in partial section of the FIG. 1 arrangement taken on the central axis, as of 3—3 of FIG. 5.
Figure 4:
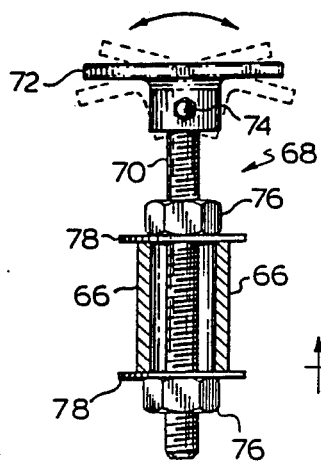
FIG. 4 is a view taken at 4—4 of FIG. 3.

Referring to the drawings, particularly FIGS. 1, 2 and 3 the subject clamping system 10 has a base portion 12, a toothed ram portion 14, a balance beam 16, and a pair of scott type clamps 18 mounted thereon.

The balance beam 16 has a pivotal support plate 20 by which the beam 16 is adjustably pivotally secured to ram portion 14. An ancilliary support means 22 is removably secured in pivotal relation with support plate 20, by way of removable pivot pin 24.

Referring to FIG. 2, a vehicle shown in phantom is supported on four of the clamping systems 10, of which the two near ones are shown.

Figure 5:
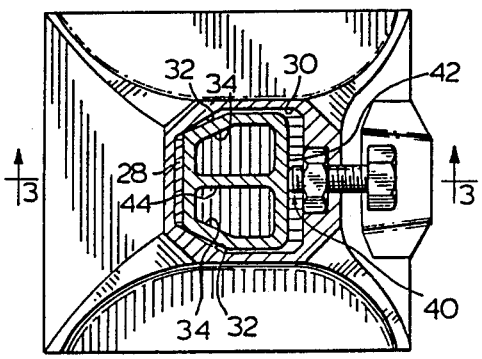
FIG. 5 is a section taken at 5—5 of FIG. 3.

Referring to FIGS. 3 and 5, ram portion 14 is shown in a partially lowered position. The base portion 12 has a single internal tooth portion 26, illustrated as engaging the second of eight ram teeth 28.

The base portion 14 has a central passage 30 wherein ram 14 extends. The passage 30 has convergently inclined flank portions 32 in centering engagement with like laterally inclined flank portions 34 of ram 14.

A pair of thrust nuts 36 positioned in non-rotating relation in shaped recesses of base 12 receive locking bolt means 38 in threaded relation therewith. The relieved inner ends 40 of bolt means 38 engage the adjacent face 42 of ram 14. An axially extending, centrally located reinforcing web 44 transmits compressive forces applied by locking bolt means 38 to the toothed front portion of ram 14.

Figure 6:
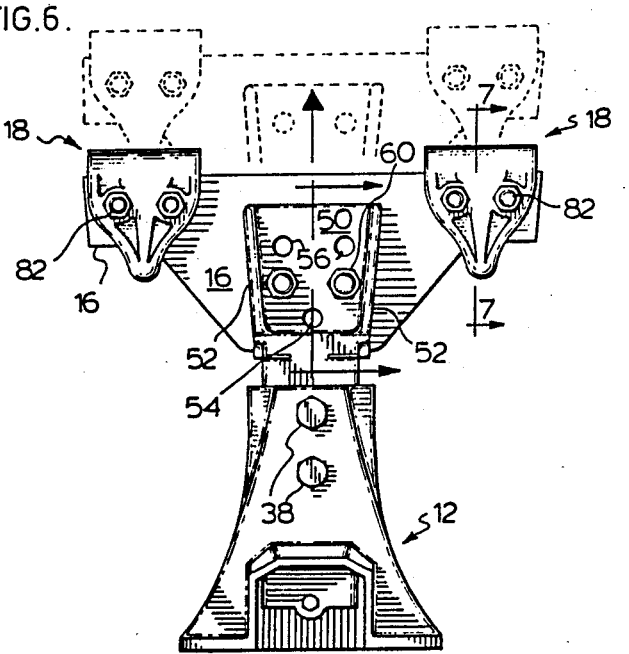
FIG. 6 is a front elevation of the subject clamping system, looking inwardly, and includes an extended position, shown in phantom.
Figure 7:
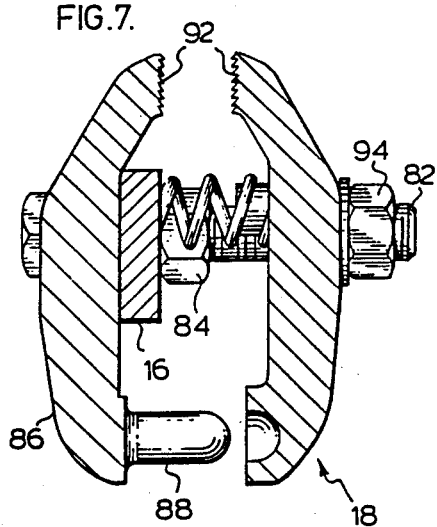
FIG. 7 is an enlarged end section of a scott clamp in preliminary attached relation with the clamp support bar taken at 7—7 of FIG. 6.
Figure 8:
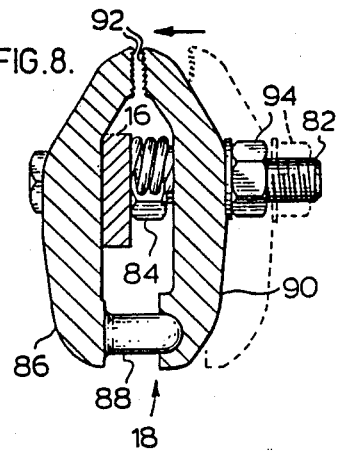
FIG. 8 is an end view similar to FIG. 7, but to reduced scale, showing the scott clamp clamping adjustment.

Referring particularly to FIGS. 3, 4, 9 and 10, the balance beam 16 has a tapered aperture 46 wherein a tapered spigot portion 48 of beam support plate 20 is inserted. Ram 14 has an upper bracket portion 50 with reinforcing side webs 52 (see also FIG. 6). The bracket portion 50 has a centered pintle aperture 54 and two pairs of apertures 56.

Beam support plate 20 is secured by bolts 58 and nuts 60 to bracket portion 50 of ram 14, by way of apertures 56. An upper set of apertures 56 permit the mounting of a scott clamp 18 directly and centrally to the bracket portion 50 of ram 14. For this purpose, the pintle aperture 54 receives the pintle pin (discussed below) of clamp 18.

Referring also to FIGS. 9 and 10, beam support plate 20 has a pair of lugs 62 receiving pivot pin 24 in sliding relation therein. The pivot pin 24 engages a bushing portion 64 of ancilliary support means 22. Ancilliary support means 22 has a U-shaped bracket 66 welded to bushing 64. An adjustable thrust assembly 68 (see FIG. 4) also has a threaded spindle portion 70 with head portion 72 pivotally pinned thereto by pin 74. Nuts 76 and washers 78 permit the thrust assembly 68 to be selectively positioned along bracket 66, and the height of head portion 72 to be electively jacked up or down. Pivotal arrangement on pivot pin 24 affords a wide angular range of positioning to head portion 72, for optimized location of ancilliary support means 22 against local downward buckling of the vehicle floor pan.

The balance beam 16 has apertures 80 adjacent the ends thereof, to receive attachment bolts 82 of scott clamps 18 therethrough. Nuts 84 serve to clamp back jaw fixed portion 86 in rigidly secured relation to beam 16; or to bracket portion 50 of ram 14, as the case may be. The clamps 18 have pintle pins 88 specifically elongated to provide access for nuts 84 between back jaw 86 and front jaw 90. The gripping of toothed jaw portions 92 to the vehicle under-rib is effected by tightening of clamp nuts 94, so that jaw pivots about pintle pin 88.

In use, with the clamping system 10 located upon a working surface, four or so of the system arrangement 10 are set at a selected common height, and the locking bolt means 38 tightened, to secure the tooth portions 26, 28 in mutually engaged relation. The inclined flank portions 32, 34 being in self centered jamming relation, preclude canting of the ram 14 relative to the base 12.

A single clamp 18 may be secured by way of top-most apertures 56 to ram bracket portion 50, having fixed jaw portion 86 secured by nuts 84, and with pintle pin 88 extending through pintle aperture 54. The movable jaw portion 90 then is applied, and tightened into work securing engagement by nuts 94.

In the case of using balance beam 16, the beam 16 is movably mounted on pivot plate 20, which in turn is movably secured to bracket portion 50 of ram 14. With a pair of clamps 18 mounted on plate 16, substantially in the manner previously described with regards to bracket portion 50, the clamps 18 are tightened into gripping relation with the vehicle and the beam 16 and pivot plate 20 firmly secured to bracket portion 50 by tightening of nuts 60.

Due to the simplicity of its construction the ram and base portions of the subject adjustable height apparatus can be cast. This leads to greatly reduced cost, particularly in fabrication man hours, together with a repeatable, high quality product of superior and uniform strength, wherein the variability of weldments is substantially avoided. Furthermore, the adoption of included nut for the jacking screws wherein the nuts are located within a cast recess, enables the use of low cost nuts, while obviating the need to drill and tap threads in the casting for entry of the jacking screws therethrough.

What is claimed is:

1. A clamping system for securing a body in supported relation at a predetermined height, having clamp means for attachment to the body in gripping, supporting relation therewith, and clamp support means secured to said clamp means, including variable height pedestal means having an open base member and a ram member secured in height adjustable relation thereto;

said base member having a first, upwardly extending inner face bounded laterally at the sides thereof by first side wall portions extending therefrom in mutual, laterally divergent relation;

said first face having laterally extending first tooth means projecting inwardly within the base member towards the ram member;

said ram member having a second face in substantially parallel, facing relation with said first face of the base member;

second tooth means extending from said second face towards said first face, in use to engage said first tooth means in load transfer relation therewith;

threaded locking means releasably securing said ram member in laterally stabilized, friction engaging relation with said first divergent side wall portions, and positioning said first and said second tooth means in mutual engaging relation, wherein said ram member is laterally restrained by said base member divergent side wall portions in a substantially centered jamming relation with said base member.

2. The system as set forth in claim 1, said base member receiving said ram member in substantially vertically entered relation therein.

3. The system as set forth in claim 1 said ram member having a plurality of teeth extending laterally across said second face of the ram member.

4. The system as set forth in claim 1, claim 2 or claim 3 wherein at least one of said base and said ram members is of cast steel.

5. The system as set forth in claim 3, said base member having a passage to receive said ram member in downwardly entered relation therein, said first tooth means including at least one tooth member extending laterally with said passage in inwardly projecting relation from said first face of the passage.

6. The system as set forth in claim 5, said threaded locking means comprising bolt means threadedly adjustably connected with a wall of the base member located oppositely of said at least one tooth member, tightening of said bolt means, in use, pressing said ram member laterally to secure said tooth means in mutually engaging relation.

7. The system as set forth in claim 5, said threaded locking means being insertable between said ram member and said base member to retain said tooth means in mutually engaged relation.

8. The system as set forth in claim 7, said locking means comprising at least one bolt means adjustably threadedly connected with said pedestal means, to secure said tooth means and said ram and said base members in mutual engaging relation.

9. The system as set forth in claim 8, said base member divergent side wall portions being in mutually inclined flanking relation, at a predetermined angle with said first face, and said ram member second face having a like pair of divergent flanking side wall portions in convergent engaging relation with said base member divergent side wall portions, whereby, in use, upon tightening of said locking means to move said first and said second faces towards each other, said convergent side wall portions abut in mutually centered relation to locate said tooth means in mutually centered relation, and to substantially preclude lateral tilting and canting of the ram member relative to said base member.

10. The system as set forth in claim 8, said bolt means comprising a cap screw in threaded relation with a nut located within said pedestal base member.

11. The system as set forth in claim 10, said nuts being located within cast recesses in an interior wall portion of said pedestal base member.

12. The system as set forth in claim 1, said clamp support means including a plate portion having a pair of spaced apart apertures therethrough to receive clamp attachment bolts in entered, secured relation therethrough.

13. The system as set forth in claim 12, said plate portion comprising a portion of said ram member extending upwardly thereof.

14. The system as set forth in claim 12, said plate portion comprising a balance beam, pivotally supported centrally thereof in secured relation to said ram member, and having a pair of clamps secured thereto in spaced apart, mutually balancing relation.

15. The system as set forth in claim 1, including support bracket means pivotally attached to one side of said base member, to extend substantially horizontally therefrom in laterally pivotal relation thereabout, said support bracket means including an ancilliary support plate adjustably attached thereto, for relative up and down movement in relation thereto.

16. The system as set forth in claim 12, said one side of said base member being located opposite from said locking means.

17. The system as set forth in claim 15 said ancilliary support plate being mounted in longitudinally adjustable relation with said support bracket means, to permit relative displacement of the ancilliary support plate towards and away from said base member.

18. The system as set forth in claim 1, said clamp means having a pair of jaw members in mutual facing relation, pivotal means extending from one of the jaw members in spacing pivotal relation with the other jaw member, a clamp attachment bar located between the opposed jaw members, having a securing bolt extending therethrough, and nut means also located between the opposed jaw members securing the clamp attachment bar in rigid bolted relation between the nut means and the adjoining jaw member.

* * * * *

UNITED STATES PATENT AND TRADEMARK OFFICE
CERTIFICATE OF CORRECTION

PATENT NO.  : 4,941,765
DATED       : July 17, 1990
INVENTOR(S) : Gerald P. Horan, et al.

It is certified that error appears in the above-identified patent and that said Letters Patent is hereby corrected as shown below:

Column 4, line 21, "jaw pivots" should read --jaw 90 pivots--.

Column 5, line 32, "with said" should read --within said--.

Column 6, line 36, "claim 12" should read --claim 15--.

Signed and Sealed this

Twenty-eighth Day of July, 1992

Attest:

DOUGLAS B. COMER

Attesting Officer            Acting Commissioner of Patents and Trademarks